UNITED STATES PATENT OFFICE.

CARLETON ELLIS, OF BOSTON, MASSACHUSETTS.

PROCESS OF TREATING LIME.

No. 800,635.  Specification of Letters Patent.  Patented Oct. 3, 1905.

Application filed July 13, 1903. Serial No. 165,363.

*To all whom it may concern:*

Be it known that I, CARLETON ELLIS, of Boston, in the county of Suffolk and State of Massachusetts, have invented certain new and useful Improvements in Processes of Treating Lime, of which the following is a specification.

Several processes are known by means of which dry hydrate of lime may be produced. All of these, however, have the disadvantage of being intermittent—that is to say, they depend upon bringing together in some way quicklime and water in a slaking-pan until the water has been absorbed by the lime. Such processes require cumbersome machinery and constant attention. The charging and discharging of the slaking consumes much time.

The object of my invention is to provide a process for the continuous production of dry hydrate of lime by the slaking of quicklime with an amount of water requisite to form calcium hydrate. My process accomplishes this as follows: The quicklime and the water are placed in two adjacent receptacles and are discharged from these in continuous streams. The stream of water should be less than one-half the mass of the quicklime stream. The stream of water is caused to unite with the stream of quicklime, and the united stream thereby produced, after proceeding a short distance from the point of union, has its continuity destroyed by means of baffle-irons or agitators placed in its path. Slaking sets in as the mass progresses, the fragments of quicklime disintegrate, the water disappears, and pulverulent hydrated lime forms. After moving for a suitable distance (depending upon the nature of the lime) in this manner the lime will be completely slaked to a dry pulverulent powder and may be discharged into bins.

By the term "destroying the continuity of the lime stream" it is to be understood that a suitable agitation of the mass is called for. It does not necessarily mean that the stream as a whole is broken or severed, but rather that the stream is mixed or beaten by suitable agitators placed in its path.

The amount of water with which a quicklime will combine to form dry hydrated lime depends upon the impurities it carries. The reaction between pure oxid of lime and water is expressed as follows:

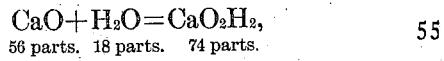

$$\underset{\text{56 parts.}}{\text{CaO}} + \underset{\text{18 parts.}}{\text{H}_2\text{O}} = \underset{\text{74 parts.}}{\text{CaO}_2\text{H}_2},$$

or fifty-six pounds of pure oxid of lime will unite with eighteen pounds of water to form seventy-four pounds of calcium hydrate. The stoichiometrical ratio of quicklime to water is therefore as fifty-six is to eighteen. Since quicklime always contains impurities of limestone, silica, iron, alumina, &c., in practice water will not be absorbed in this ratio, but in lesser amount. In the case of magnesian quicklime the amount of water taken up chemically is very much less, as oxid of magnesia does not readily form a hydrate under the same conditions. In practice I have found considerable water to be lost as steam during the slaking. The temperature of the slaking mass reaches 212° Fahrenheit, and some water is vaporized before it can be absorbed by the lime. It is necessary to allow for this loss, and therefore to exceed the stoichiometrical ratio of fifty-six to eighteen a ratio of fifty-six to twenty is more suitable for quicklime high in oxid of lime. This means that if in a given interval the stream from the lime-bin discharges fifty-six pounds of quicklime during that same interval twenty pounds of water must mingle uniformly with the lime stream. The lime used may be lime in small particles, such as cracked lime or ground lime. The more finely divided it is the quicker the reaction of hydration sets in. I prefer to warm the water used before mingling with the lime. Cold water retards the reaction and makes the start uncertain. Water at a uniform temperature is therefore desirable. The best results are obtained by using the water at a temperature of 150° Fahrenheit or higher, this to be determined according to quality of lime.

My process for the continuous slaking of lime produces a uniform product with simpler apparatus than that used in other processes. The saving in labor by my process is also very great as compared with the present intermittent processes.

The process differs from all others of which I am aware in that the steps of saturation with water, hydration, or slaking of the lime and drying of the hydrated lime are carried on simultaneously in successive portions of the same progressing stream. In this way the different steps do not interfere with each other, as they must necessarily do where it is attempted to have them occur successively and uniformly at all points within the same mass. It will be seen that it is much easier to obtain a uniform and completely-hydrated product by my process than by intermittent treatment in batches. The stream may be of relatively small section, and thus it is easy to completely saturate with its proper quantity of water each unit length of the stream of quicklime before hydration sets in. When hydration begins, it is not interfered with by the presence or addition of surplus water, and when hydration is complete the moisture dries out in the last portion of the stream without the obstruction of lime in process of slaking, though the drying is aided by heat produced in the precedent slaking portion of the stream.

The process is endless—that is, non-cumulative and without any limit imposed by its nature.

In a separate application, Serial No. 270,193, dated July 18, 1905, I have claimed a specific form of the present invention involving the production of dry hydrate containing some unchanged or free calcium oxid.

What I claim as my invention, and desire to secure by Letters Patent, is—

1. A process for producing dry hydrate of lime which consists in saturating at one point a stream of quicklime with a stream of water sufficient in quantity to completely hydrate the lime, and impelling the stream of mingled lime and water away from the mingling-point for the purpose of allowing hydration to take place.

2. A process for producing dry hydrate of lime which consists in mingling before any substantial hydration takes place a stream of quicklime with enough water to complete its hydration, carrying the saturated lime in the form of a progressing stream away from the point of mingling, and completing the hydration and drying of said stream without further addition of water.

3. A process for producing dry hydrate of lime which consists in causing quicklime to progress in the form of a stream, adding to said stream at one point the amount of water necessary to its complete hydration to a dry powder, and conducting the hydration and drying of said stream at different points succeeding the point of mingling with water.

4. A process for producing dry hydrate of lime which consists in commingling at one point a stream of quicklime and a stream of water sufficient to completely hydrate the lime to a dry powder, and stirring the stream at a succeeding point through the period of hydration.

5. A process for producing dry hydrate of lime which consists in uniformly commingling at one point a stream of quicklime and a stream of water in proportion to form a dry hydrate, endlessly impelling the resultant stream away from the point of mingling throughout the period of hydration, and mechanically agitating the progressing stream without further addition of water until it is converted into dry hydrate.

In testimony whereof I have affixed my signature in presence of two witnesses.

CARLETON ELLIS.

Witnesses:
  EUGENE HAYFORD,
  GEORGE W. CRAWFORD.